Patented Oct. 26, 1926.

1,604,315

UNITED STATES PATENT OFFICE.

HENRY L. PRESTHOLDT, OF MINNEAPOLIS, MINNESOTA.

CASEIN GLUE.

No Drawing.   Application filed April 17, 1922. Serial No. 554,204.

My present invention provides a new composition of matter, herein designated as "casein glue", but which, from its broader aspect, is an adhesive composition adapted to be used, by itself or commingled with other substances, as an adhesive coating.

In this improved adhesive composition, casein is used as the adhesive base and is commingled with calcium hydroxide, calcium chloride, sodium sulphite, tri-sodium phosphate, sodium molybdate and oil. Preferably, both kerosene and castor oil are used. Sodium molybdate is introduced to prevent and retard the formation of nitrogen and precipitates ammonia. This composition makes an excellent, high grade joint glue having a liquid life of several days without deterioration.

I have obtained a very highly efficient glue or adhesive by the use of the above substances in accordance with the following formula:

|  | Parts. |
|---|---|
| Casein | 50 to 75 |
| Calcium hydroxide | 10 to 30 |
| Calcium chloride | 5 to 15 |
| Sodium sulphite | 3 to 10 |
| Tri-sodium phosphate | 10 to 20 |
| Sodium molybdate | 0 to 4 |
| Kerosene | 3 to 6 |
| Castor oil | 0 to 4 |

The above noted substances, except the oils, are commingled in dry powdered form and the oils commingled therewith are in such small quantity that they do not make the powdered mass pasty but keep the same from getting into dust form. The composition is sold in dry powdered form and, when it is to be used, it will be introduced into water to form an emulsion, and it is then, of course, that the chemical reactions that develop the adhesive qualities of the composition, will take place. After these reactions have taken place, the emulsion is adapted to be used as a glue or as a coating or to be commingled with other substances, such as paints or calcimine, which contain certain color pigments. When desired, however, the color-producing pigments may be commingled with the dry composition. When the composition is to be used simply as a glue, no additions to the formula given, except water, will be required.

Casein produces the colloidal properties, imparting to the glue powder adhesive qualities. Calcium chloride, sodium sulphite and tri-sodium phosphate are used as a solvent in an aqueous solution. To this is added calcium hydroxide, having the property of uniting with casein, forming calcium caseinate, which are insoluble, and imparting to the glue emulsion waterproof qualities. Sodium sulphite, in contact with the tri-sodium phosphate, reduces the alkalinity of the glue mixture and prevents staining and also imparts a penetrating quality to the glue. Sodium molybdate is used for the purpose of resisting and retarding the formation of nitrogen, ammonia being precipitated. The kerosene oil is used for the purpose of preventing calcium hydroxide from decomposing. Castor oil is incorporated to give more body to the glue emulsion. Kerosene and castor oil are preferred but not necessary elements of the composition.

What I claim is:

An adhesive composition made substantially in accordance with the following formula:

|  | Parts. |
|---|---|
| Casein | 50 to 75 |
| Calcium hydroxide | 10 to 30 |
| Sodium sulphite | 3 to 10 |
| Tri-sodium phosphate | 10 to 20 |
| Sodium molybdate | ½ to 4 |
| Calcium chloride | 5 to 15 |

In testimony whereof I affix my signature.

HENRY L. PRESTHOLDT.